United States Patent [19]

Van Uijen

[11] Patent Number: 4,932,017

[45] Date of Patent: Jun. 5, 1990

[54] METHOD AND APPARATUS FOR READING AND WRITING INFORMATION ON A RECORDING MEDIUM

[75] Inventor: Cornelis M. J. Van Uijen, Eindhoven, Netherlands

[73] Assignee: U.S. Philips Corporation, New York, N.Y.

[21] Appl. No.: 190,548

[22] Filed: May 5, 1988

[30] Foreign Application Priority Data

Dec. 3, 1987 [NL] Netherlands .................. 8702904

[51] Int. Cl.⁵ .............................................. G11B 7/00
[52] U.S. Cl. ............................................. 369/48
[58] Field of Search ................ 358/342; 369/32, 33, 369/43–48, 109, 111, 275, 57, 58, 59; 250/201

[56] References Cited

U.S. PATENT DOCUMENTS 4,569,038 2/1986 Nagashima et al. ........... 369/111 X

Primary Examiner—Robert L. Richardson
Attorney, Agent, or Firm—Emmanual J. Lobato; John Francis Moran

[57] ABSTRACT

A method and device are disclosed for recording information represented by a code signal Vd on an optically readable record carrier (1) by means of optically detectable recording marks (8). Outside the areas (30) of the record carrier (1) which are used for recording the information signal reference marks (33) are formed. When the record carrier is read a detection signal Vd is generated, from which the code signal is derived by comparison of the detection signal Vd with a decision level Vref. The decision level Vref is derived from those portions (34) of the detection signal Vd which are representative of the reference marks (33).

12 Claims, 4 Drawing Sheets

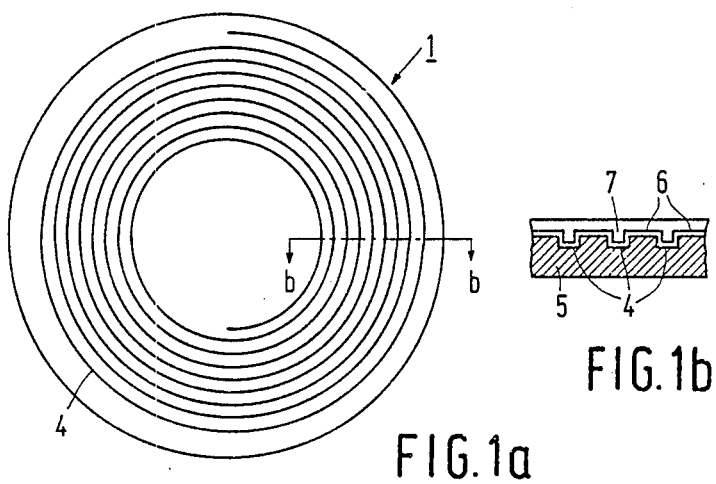
FIG.1b
FIG.1a
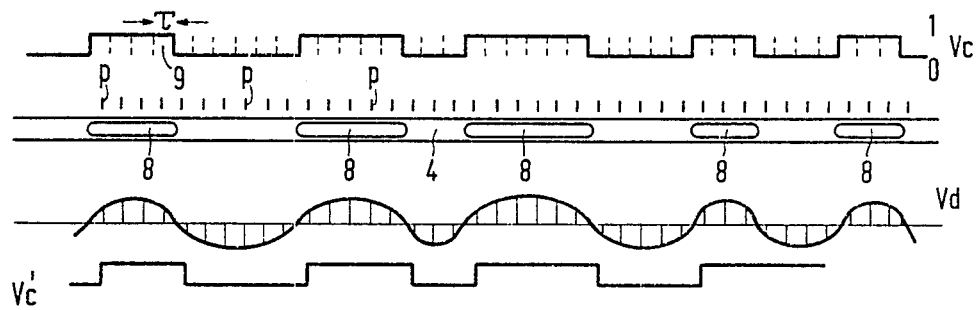
FIG.2
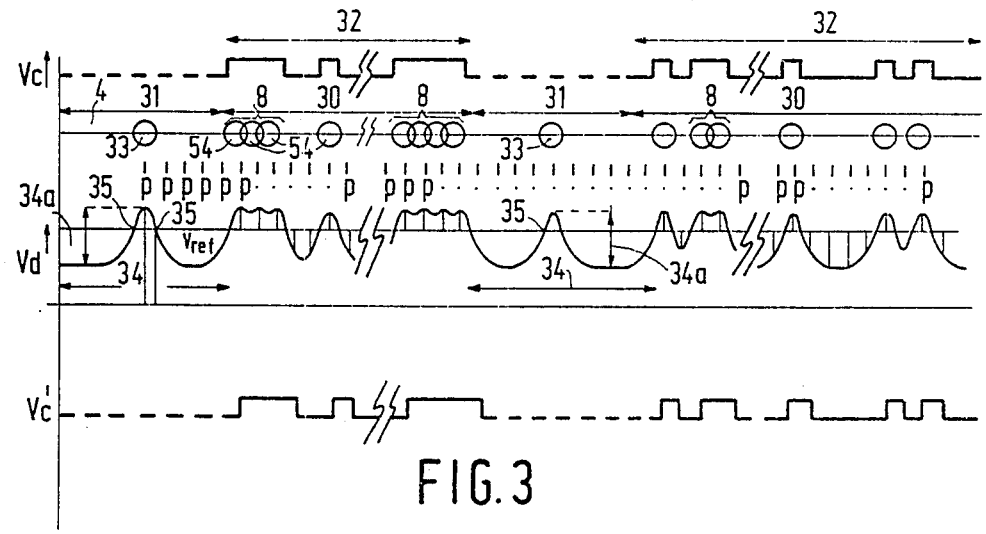
FIG.3

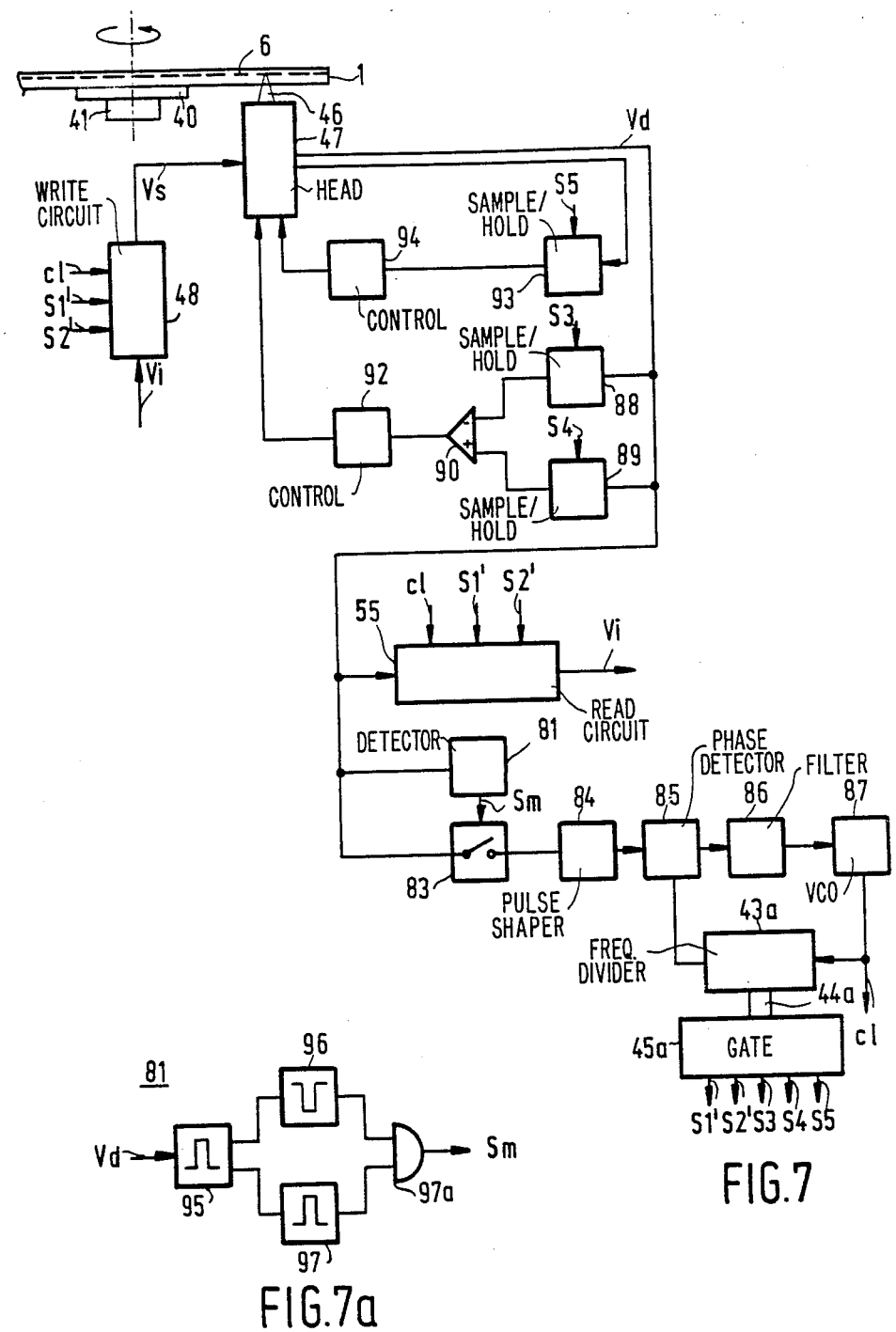

METHOD AND APPARATUS FOR READING AND WRITING INFORMATION ON A RECORDING MEDIUM

The invention relates to a method of recording information in a track on a record carrier of an inscribable type by forming a pattern of optically detectable recording marks.

The invention further relates to a device for recording information in a track on an inscribable record carrier by forming a pattern of optically detectable recording marks, which device comprises drive means for moving the record carrier past a write head and a control circuit for controlling the write head in conformity with a code signal which is related to the information, in order to form said pattern of recording marks.

The invention further relates to a device for reading a record carrier on which information is recorded in a track by means of a pattern of optically detectable recording marks, which device comprises a scanning device for scanning the track by means of a radiation beam, the radiation beam reflected or transmitted by the record carrier being modulated in conformity with the pattern of recording marks, an optical detector for detecting the modulated radiation beam and for generating a detection signal of a signal strength corresponding to the modulation of the radiation beam, and means for converting the detection signal into a binary code signal by comparison of the signal strength with a decision level.

Such a method and such devices are known, inter alia from the Book "Principles of optical disc systems" (ISBN-O-85 274-785-3), published by Adam Hilger Ltd.

SUMMARY OF THE INVENTION

Said book describes how recording and reading are effected in the CD audio system. In this system the information is recorded by means of a d.c. limited code. In this d.c. limited code the number of code bits of the logic value "1" is in a fixed ratio to the number of code bits of the value "0". This enables the decision level to be derived from the detection signal by simply determining the d.c. component of the detection signal. However, this code has some disadvantage which render it less suitable for uses where digital information is to be recorded on and read from arbitrary locations on the record carrier, as is desirable, for example, in the case of computer applications.

A first disadvantage is that when an arbitrary part of the record carrier is to be read it is necessary to scan a substantial portion of the track preceding the part to be read in order to ensure that a reliable decision level is available when reading begins. This presents a problem in particular if the track portion to be read is preceded by a track portion which is still blank. This occurs in particular when searching for sector addresses on record carriers which are divided into sectors containing a sector address at the beginning.

Another drawback of said code is that it is antecedental, i.e. the manner in which the data word is converted into code bits depends on the preceding data words. If a limited number of data words of a recorded sequence is to be modified, this would mean that the entire sequence has to be re-encoded and recorded again.

It is an object of the invention to provide means to arrive at a code enabling the number of requirements imposed on the detection to be reduced.

In accordance with a first aspect of the invention the method is characterized in that freely situated reference marks of the same type as the recording marks used for recording the information signal are provided at retraceable positions outside the track portions used for information recording.

In accordance with a second aspect of the invention the recording device is characterized in that the control circuit comprises means for temporarily interrupting the formation of said pattern and means for generating during said interruption a control signal for the write head, to form freely situated reference marks at retraceable positions on the record carrier.

In accordance with a third aspect of the invention the read device is characterized in that the device comprises means for detecting portions of the detection signal which represent reference marks which are situated freely outside the track portion used for recording the information, and means for deriving the decision level from the signal strength of the detected portions.

During reading the decision level is derived from those portions of the detection signal which represents the reference marks. The reference marks are situated freely, so that the process of determining the decision level is not affected by crosstalk caused by adjacent marks in the detection signal. Moreover, since the reference marks are situated at retraceable positions the extent to which the radiation beam is modulated by the recording marks can be determined reliably, enabling the decision level to be derived in a reliable manner without the need to impose additional requirements on the code.

An embodiment of the method is characterized in that the track is provided with preformed optically detectable control symbols which can be distinguished from the pattern of recording marks to be formed, the reference marks being provided at predetermined positions relative to the control symbols.

This embodiment has the advantage that every freely situated recording mark is situated at an easy-to-locate position.

A further embodiment of the method is characterized in that the spacings between successive control signals are substantially constant, the control symbols being servo-control symbols provided for the purpose of tracking, focussing and clock generation.

This embodiment yields a record carrier which enables any influence of the pattern of recording marks to be formed, the reference marks being provided at predetermined positions relative to the control symbols.

This embodiment has the advantage that every freely situated recording mark is situated at an easy-to-locate position.

A further embodiment of the method is characterized in that the spacings between successive control signals are substantially constant, the control symbols being servo-control symbols provided for the purpose of tracking, focussing and clock generation.

This embodiment yields a record carrier which enables any influence of the pattern of recording marks representing the information on focus control, tracking and clock generation on the information-reading process to be eliminated completely, which means that the number of restrictions to be imposed on the code is minimal.

An embodiment of the read device is characterized in that the device comprises clock-generation means for generating a first clock signal which is indicative of the instants at which the detection signal is to be compared with the decision level, which clock-generation means are adapted to generate a second clock signal which is in synchronism with the scanning instants of the reference marks, and which is phase-shifted relative to said scanning instants by a value corresponding to half the period of the first clock signal, and in that the decision-level-deriving means comprise a sample-and-hold circuit for sampling the detection signal in response to the second clock signal in order to derive the decision level.

This embodiment has the advantage that the signal values of the detected samples can be used as decision levels in the case of low information densities. This is because these values correspond to the center of the smallest eye opening in the eye pattern of the detection signal.

Another embodiment of the read device is characterized in that the decision-level-deriving means comprise a detection circuit for determing the height of the detection-signal peaks during derivation of the reference marks relative to the detection-signal value immediately before or after scanning of the reference mark, and means which adjust the decision level to a value corresponding to a specific fraction of the detected peak height.

The information density on a record carrier which has been recorded with a constant angular velocity is radius-dependent. This means that during reading the optimum decision level, which corresponds to the center of the smallest eye opening in the eye pattern of the detection signal, is also radius dependent. A read device which is very suitable for reading such a record carrier is characterized in that the means for adjusting the decision level include means for adapting the decision level depending on the radial position of the track portion being scanned.

An embodiment of the read device is characterized in that the reference-level-deriving means include means for determining a weighted mean of the signal strength of the detection-signal portions which correspond to the reference marks being scanned and means which derive the decision level from the weighted mean thus determined.

This embodiment has the advantage that it precludes an undesirably large change in decision level as a result of an occasionally misread or misrecorded reference marks.

BRIEF DESCRIPTION OF THE DRAWING

The invention and further advantages thereof will now be described in more detail, by way of example, with reference to FIGS. 1 to 7, of which FIGS. 1a and 1b shows an optically inscribable record carrier, FIG. 2 shows a code signal Vc, the pattern of recording marks on the information carrier representing this code signal, the detection signal Vd obtained when the record carrier is read, and the code signal Vc' recovered from the recording signal in the case of a recording made in accordance with the prior art, FIG. 3 gives the code signal Vc, the pattern of recording marks, the detection signal Vd and the recovered code signal Vc' in the case of a recording made in accordance with the invention, FIGS. 7 and 7a shows another embodiment of the recording and read device in accordance with the invention.

DETAILED DESCRIPTION OF THE INVENTION

Figure 4:
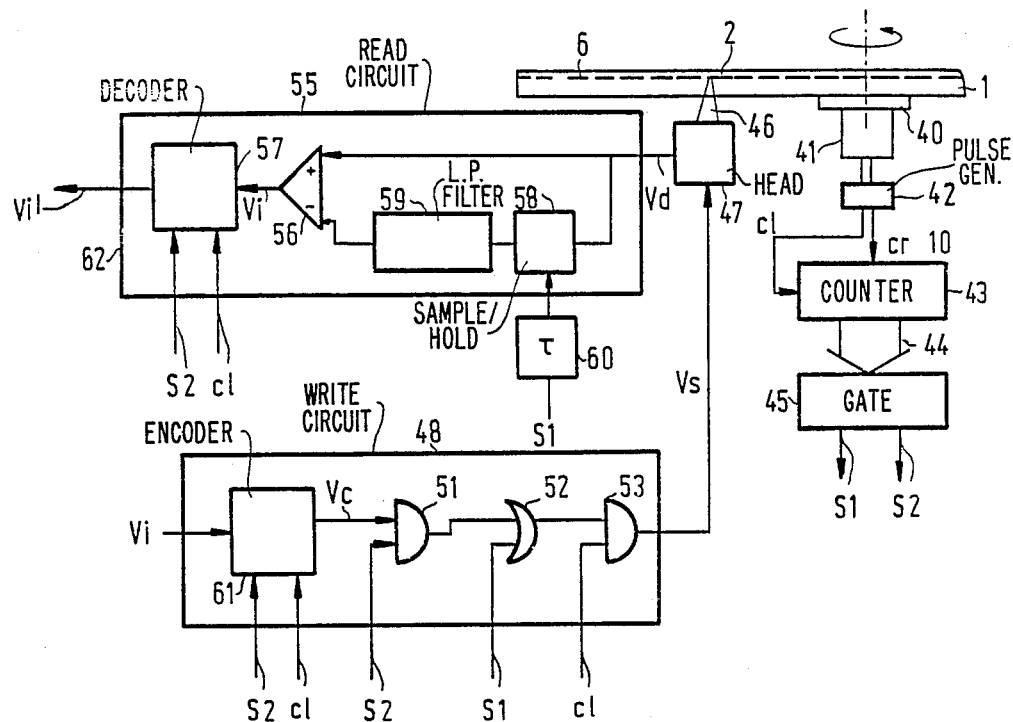
FIG. 4 shows an embodiment of the read and write device in accordance with the invention.

FIG. 1a shows a disc-shaped record carrier 1 provided with a preformed pattern of tracks 4.

Such a track pattern may comprise, for example, a preformed spiral groove in a substrate 5. In FIG. 1b, which shows a part of the sectional view of the record carrier 1 taken on the line b—b, these grooves are shown to a strongly enlarged scale. The substrate 5 is covered with a radiation-sensitive layer 6 of a customary type which, if exposed to radiation of a sufficiently high energy content, is subjected to an optically detectable change. Such a layer 6 may consist of, for example, a tellurium alloy, which by exposure to a radiation beam can be heated locally in such a way that the layer is removed at the location of heating.

The layer 6 may alternatively consist of a "phase-change" material, which upon heating by a radiation beam is subjected to a change in structure, for example a change from an amorphous to a crystalline structure or vice versa.

Alternatively, the layer 6 may consists of a magneto-optical material whose direction of magnetisation can be changed by influencing the layer by applying a magnetic field and at the same time locally heating the magneto-optical material by means of a radiation beam. The layer 6 is covered with a protective coating 7.

The track pattern shown in FIG. 1 comprises a continuous groove. However, such a track pattern may also be constituted exclusively by, for example, servo-control symbols situated at equidistant angular positions, which symbols define the position of the track to be used for recording.

An information signal can be recorded in the track 4 by scanning the track 4 with a radiation beam and modulating the beam in such a way that a pattern of recording marks representative of the information signal is formed in the track. For this purpose it is common practice to convert the information signal into a binary code signal and subsequently to modulate the radiation beam in conformity with the code signal, yielding a pattern of recording marks such that portions of the code signal of a first logic value, for example "1", in the pattern correspond to portions of the track occupied by recording marks and portions of another logic value, for example "0", correspond to the unoccupied track portions.

FIG. 2 shows patterns of recording marks 8 and the corresponding code signal Vc obtained as described above.

Said code signal Vc comprises bit cells 9 of constant length $\tau$. The centers of the bit cells 9 correspond to equidistant symbol positions, indicated by the letter p in FIG. 2. The code signal Vc can be read from the track 4 by scanning the track 4 with a radiation beam and subsequently detecting the modulation produced in the reflected beam by the pattern of recording marks 8 by means of an optical detector of a customary type, which detector generates a detection signal Vd of a signal strength corresponding to the modulation of the radiation beam produced during scanning. The detection signal Vd thus obtained is also shown in FIG. 2. A code signal Vc' identical to the original code signal Vc is recovered from the detection signal Vd by comparing the detection signal Vd with a decision level Vref at the instants at which the center of the radiation beam corresponds to the symbol positions p. The logic value of the recovered code signal Vc depends on the result of the comparison. In order to enable the reference level to be derived simply from the detection signal Vc it is customary to utilize a d.c. limited code. The d.c. component in the detection signal may then be employed as the decision level.

The requirements to be imposed on the code in order to obtain this d.c. limitation make this code less suitable for use in systems in which digital information is to be recorded at random locations on the record carrier, as is generally desirable in computer applications.

Referring now to FIG. 3, a method of recording and reading in accordance with the invention will be described, which enables the decision level to be recovered from the detection signal Vd in a simple and reliable manner and which does not impose any restrictions on the code.

In the track 4 shown in FIG. 3 portions 30, representative of portions 32 of the code signal Vc, alternate with portions 31 in which a reference mark 33 is formed. The reference marks 33 are formed in the layer 6 by means of a radiation beam in the same way as the recording marks 8, so that they have the same modified optical properties as the recording marks 8, which in the Figure comprise one or more elementary marks 54. These elementary marks are the smallest possible marks that can be formed by the recording device used.

When the track 4 is read the reference level is derived from that portion of the detection signal Vd which corresponds to the reference mark 33, for example by selecting a reference level which is equal to a predetermined percentage of the difference 34a between the minimum and the maximum value of the detection-signal portion 34.

Another suitable value for the reference level is the signal strength of the detection signal at the instant at which the spacing between the center of the radiation beam and the center of the reference mark 33 is equal to half the spacing between the symbol positions p. In FIG. 3 these values bear the reference numeral 35.

In order to enable the reference level Vref to be derived, it is necessary to provide the reference marks 33 at retraceable positions. If a disc-shaped record carrier is used this can be achieved, for example, by arranging the reference marks at predetermined angular positions. In the case of a record carrier provided with preformed optically detectable control symbols which can be distinguished from the patterns of recording marks as formed during information recording, the reference marks 33 are preferably situated at predetermined positions relative to these control symbols.

In the method described in the foregoing the reference level is derived from the detection signal. This has the advantage that the intensity of the radiation beam and the properties of the material of the layer 6, for example the reflection coefficient, do not influence the reliability of the recovery of the code signal Vc'.

FIG. 4 shows an embodiment of a recording and read device in accordance with the invention. In the present embodiment the record carrier 1 is fixed onto a turntable 40. The turntable 40 is driven by drive motor 41 which is mechanically coupled to a pulse generator 42 for generating a pulse-shaped clock signal c1 whose frequency is proportional to the angular velocity of the record carrier 1.

The period of the clock pulses of the clock signal corresponds to the spacing between the symbol positions p. The pulse generator 42 further comprises customary means for generating one reset pulse cr every revolution. The clock signal c1 is applied to a cyclic counter 43 for counting the pulses of the clock signal c1. The counter range of the cyclic counter 43 is selected so as to obtain an integral number of counter cycles in one complete revolution of the disc. In the present embodiment the counter range is "65". The reset pulse cr is applied to a reset input of the counter 43 to set the counter 43 to zero. The count of the counter 43 is transferred to a gate circuit 45 via a bus 44, which gate circuit generates a signal S2 of a logic value "1" for the counts "6" to "65" and a signal S1 of a logic value "1" during the time that the count of the counter 43 is "3". The gate circuit 45 may comprise conventional comparator circuits, which compare the count with a desired count and which supply the result of the comparison in the form of a logic signal. However, it is also possible to use other circuits, for example a read-only memory (ROM) or a programmable logic array (PLA).

An optical read/write head 47 of a customary type is arranged opposite the rotating record carrier 1 to scan the track 4 by means of a radiation beam 46. The read/write head 47 comprises beam-modulating means for modulating the beam in conformity with a write signal Vs supplied by a write circuit 48 to form the pattern of recording marks in the track 4.

The write circuit 48 comprises an encoding circuit 61 for converting the binary information signal Vi into the code signal Vc. The encoding circuit, which is shown in detail in FIG. 4a, comprises a serial-parallel converter 62 to form m-bit information words, for example 8-bit information words. By means of a memory 63, for example a ROM, the m-bit information words are converted into n-bit code words, for example 12-bit code words. The n-bit code words are converted into the serial code signal Vc by means of a parallel-serial converter 64.

In order to control the conversion process the encoding circuit 61 comprises a control circuit 65 which is adapted to generator clock signals c12 and c13, which are derived from the clock signal c1 in a customary manner. The control circuit 65 is dimensioned in such a way that the frequency of the clock signal c12, which is applied to the clock input of the serial-parallel converter 62 via a two-input AND-gate 66, is equal to m/n times the frequency of the clock signal c1.

The frequency of the clock signal c13, which is applied to the parallel load input of the parallel-serial converter 64 via the two-input AND-gate 67, is equal to 1/n times the frequency of the clock signal c1. The clock signal c1 is applied to the clock input of the parallel-serial converter 64 via a two-input AND gate 68. Moreover, the signal S2 is applied to the inputs of the AND gates 66, 67 and 68, so that during the counts "6" to "65" the clock signals c1, c12 and c13 are transferred to the converters 62 and 64 and during the counts "1" to "5" the clock signals c1, c12 and c13 are inhibited by the gates 66, 67 and 68. Thus, it is achieved that during scanning of the symbol positions p6 to p65 the information signal Vi is converted into the code signal Vc and during scanning of the symbol positions p1 to p5 conversion is suspended.

Figure 5:
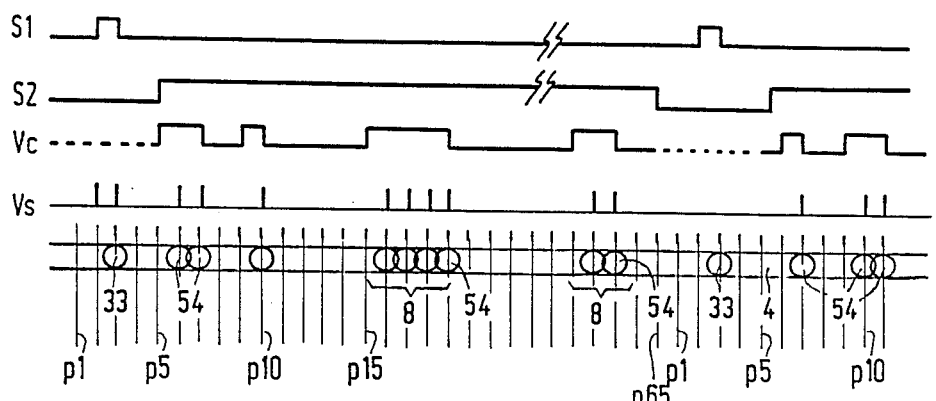
FIG. 5 shows a number of signal waveforms appearing in the device of FIG. 4.

The code signal Vc is applied to one of the inputs of a two-input AND gate 51 and the signal S2 is applied to the other input of the AND-gate 51, so that the code ignal Vc is only transferred to the output of the output of the AND gate 51 while the symbol positions p6 to p65 are scanned. The output of the AND gate 51 is applied to one of the inputs of the two-input AND gate 53 via an OR gate 52. The pulse-shaped clock signal c1 is applied to the other input of the AND gate 53, so that for each code bit of the logic "1" value one pulse of the clock signal is transferred to the output of the AND gate 53 (see FIG. 5). The output signal of the AND gate 53 functions as the write signal Vs for the write head 47. In response to every pulse of the write signal Vs the write head 47 produces a radiation pulse to expose the layer 6 over an area corresponding to the diameter of the radiation beam and thereby produce an optically detectable change in this area. These areas constitute the elementary marks 54. As is apparent from FIG. 5, all the recording marks thus formed comprise one or more of these elementary marks 54.

When the count "1" is reached by the counter 43 the flow of codeword bits at the output of the encoding circuit 61 is temporarily interrupted in response to a 1-O transition in the signal S2 until the count "6" is reached again and the signal S2 becomes "1" again. When the count "3" is reached the signal S1 becomes "1". As this signal is also applied to the AND gate 53 via the OR gate 52, a clock pulse of the clock signal c1 is transferred to the read write head 47 for the count "3", so that for every count "3" an elementary mark 54 is recorded in the track 4, which mark functions as the reference mark 33.

If the track 4 is to be read, the read/write head 47 can be set to the read mode, in which mode the intensity of the radiation beam 46 is maintained at a constant value which is inadequate to produce a change in the layer 6. The read/write head 47 comprises an optical detector for detecting the modulation produced in the reflected beam by the pattern of recording marks 8 in the track 4 and for generating a detection signal Vd of a signal strength corresponding to this modulation. The detection signal Vd is applied to a read circuit 55. The read circuit 55 comprises a comparator 56 having a non-inverting input to which the detection signal Vd is applied and having an inverting input to which a reference signal whose voltage level corresponds to the decision level Vref is applied.

Figures 4A, 4B:
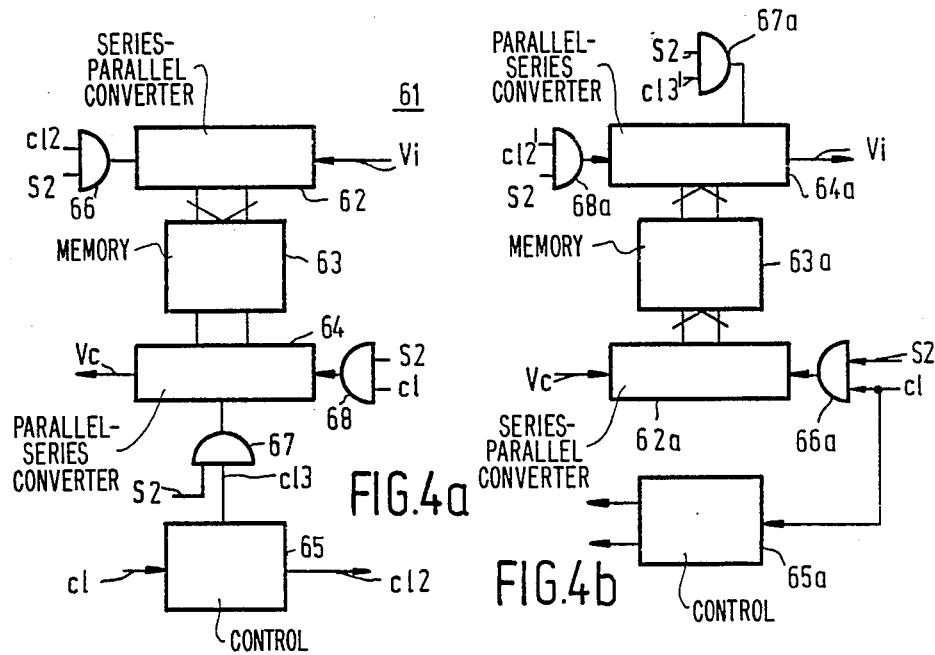
FIG. 4a illustrates an encoding circuit used in the device shown in FIG. 4.
FIG. 4b illustrates a decoding circuit used in the device shown in FIG. 4.

The output of the comparator 56 is applied to a serial data input of a serial-parallel converter 62a of a decoding circuit 57 (see FIG. 4b). The serial-parallel converter 62a is controlled by the clock signal c1, which is applied to the clock input of the converter 62a via a two-input AND gate 66a. The signal S2 is also applied to the AND gate 66a, so that the output signal of the comparator 56 is read into the converter 62a only during the time that this output signal is representative of the recovered code signal Vc'. The signal on the output of the comparator 56 is thus converted into n-bit code words, which are converted into m-bit information words by means of a memory 63a, for example a ROM. In response to the clock signal c12', which is applied via a two-input AND gate 68a, the m-bit information words are read into a parallel-serial converter 64a.

The m-bit information words thus read in are converted into the serial binary information signal Vi' under control of a clock signal c13', which is applied to the clock input of the converter 64a via a two-input AND gate 67a. The signal S2 is also applied to the gates 67a and 68a, so that conversion is suspended during the time interval in which S2 indicates that the symbol positions p1 to p5 are being scanned. The clock signals c12' and c13' are derived from the clock signal c1 in a customary manner by means of a control circuit 65a, which is dimensioned in such a way that the frequencies of the clock signals c12' and c13' are equal to m/n times and 1/n times the frequency of the clock signal c1 respectively.

For the purpose of deriving the reference signal the read circuit 55 comprises a sample-and-hold circuit 58 for sampling the detection signal at instants at which the center of the beam 46 has reached a position which is situated at a distance beyond the center of the reference mark 33 which corresponds to substantially half the spacing between the symbol positions. The control signal for the circuit 58 can be derived from the signal S1 by delaying the signal S1 by a time corresponding to half the spacing between the symbol positions by means of a delay circuit 60. The level of the output signal of the circuit 58 can be used as the decision level Vref. Suitably, the output signal of the circuit 58 is applied to the comparator 56 via a low-pass filter 59.

The output signal of the low-pass filter 59 is a measure of the weighted mean of the samples of the detection signal, the influence of the reference marks on the output signal diminishing as scanning of the reference mark took place earlier. The advantage of such an averaging is that the influence of an incorrectly recorded or read reference mark on the reference level is minimal. It will be appreciated by those skilled in the art that averaging can be achieved by numerous other methods than by means of a low-pass filter, for example by means of a microcomputer loaded with a suitable averaging program.

It is to be noted that there are various other ways of deriving the decision level from the detection-signal portions obtained during scanning of the reference marks 33. For example, the signal value of the flat portion of the detection signal Vd just before or just after scanning of the reference area can be sampled by means of a first sample-and-hold circuit. Subsequently, the maximum signal value during scanning of the center of the reference mark 34 can be determined by means of a second sample-and-hold circuit. The difference between the output signals of the sample-and-hold circuits indicates the height of the signal peak produced in the detection signal Vd by the reference mark 34. The decision level can be derived from this peak height by multiplying the signal value of the peak height by a specific factor. Since the spacing between the symbol positions depends on the radius (the record carrier rotates with a constant angular velocity) and hence the magnitude of the eye opening of the eye pattern dictated by the detection velocity, it is desirable to make said multiplication factor dependent upon the radius in order to obtain an optimum decision level (i.e. the center of the smallest eye opening), in such a way that the decision level is adjusted to a higher value as the spacing between the symbol positions decreases, i.e. as the track to be read is situated closer to the disc center.

This can be achieved, for example, by arranging a multiplier in the signal path between the output of the filter 59 and the comparator 56, to multiply the output signal of the low-pass filter by a radius-dependent value which can be derived from the radial position of the read/write head 47 in a customary manner by means of a position detector.

It is to be noted that if the decision level is derived from the detection signal value at the instant at which the scanning beam is situated at half the symbol-position spacing, the desired decision level in the case of very high information densities should be higher than the detected value as a result of inter-symbol interference. In the case of a disc-shaped record carrier it is then also desirable to apply a radius-dependent correction to the level thus detected.

It is to be noted also that in principle the radius-dependent adaptation is not necessary if the decision level is adjusted to a value suitable for the minimum symbol-position spacing.

In the device shown in FIG. 4 the cyclic counter 43 is controlled by the clock pulses c1 from the pulse generator 42. However, alternatively the counter 43 can be controlled by clock pulses supplied by a fixed-frequency oscillator, the motor being controlled by means of phase-locked-loop techniques in such a way that the pulses generated by the pulse generator 42 are in synchronism with the clock pulses generated by the oscillator.

Figure 6A:
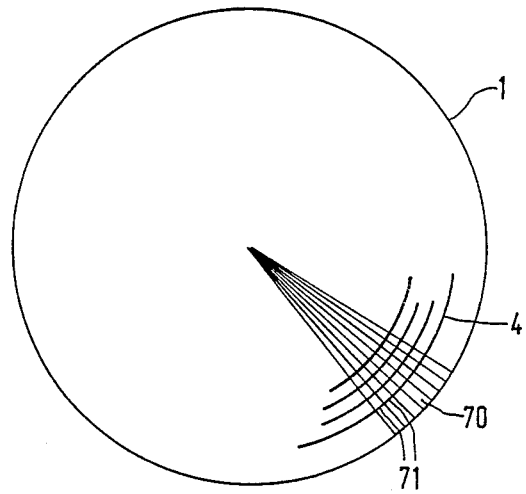
FIGS. 6a and 6b shows another embodiment of an optically inscribable record carrier.

FIG. 6a shows an embodiment of the record carrier 1, which is divided into sectors 70, which are shown only partly in FIG. 6a. These sectors divide the tracks into the segments 71.

Figure 6B:
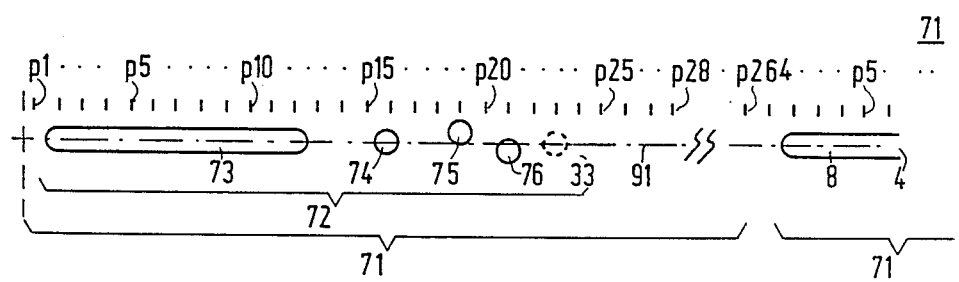

FIG. 6b shows one of the segments 71 to a strongly enlarged scale. Each segment comprises a fixed number of symbol positions. For the present record carrier this number is selected to be, for example, 264.

The portion of the track 4 comprising the symbol positions p1 to p24 contains a preformed optically detectable control symbol 72, comprising for example prerecorded pits. The control symbol and the code used for recording the information signal are adapted to one another in such a way that the pattern of prerecorded control marks 73, 74, 75 and 76 differs from the pattern of recording marks 8 formed when the information signal is recorded.

For example, if a code is selected for which the maximum length of the recording marks 8 to be formed is smaller than the prerecorded control mark 73, the control symbol 72 can always be distinguished from the pattern of recording marks 8 formed when the information signal is recorded.

For the purpose of controlling the write and read process control marks 74, 75 and 76 are formed. The manner in which the necessary control signals are derived from the control marks 74, 75 and 76 will be described in detail hereinafter.

FIG. 7 shows an embodiment of a write and read device in accordance with the invention for recording and reading an information signal on/from the record carrier shown in FIG. 6, elements corresponding to the elements shown in FIG. 4 bearing the same reference numerals.

The detection signal Vd supplied by the write/read head 47 is applied to a detection circuit 81 for detecting the control marks 73, whose length corresponds to eleven symbol positions. The detector circuit 81, shown by way of example, comprises a level-sensitive retriggerable monostable multivibrator 95 which is retriggered each time that a low level appears on its trigger input, so that in the case of a sustained low-level signal on the trigger input the output signal of the multivibrator 95 remains "1". The monostable multivibrator 95 operates in such a way that after the level on the trigger input has changed from low to high the output signal remains "1" for a time interval corresponding to 11.5 symbol positions.

The output signal of the multivibrator 95 is applied to a monostable multivibrator 96 and a monostable multivibrator 97, which are responsive to a 1-0 transition in the output signal of the multivibrator 95 to generate a positive pulse and a negative pulse respectively. The positive and negative pulses are applied to an AND-gate 97a. The pulse durations of the positive and the negative pulses are selected in such a way that on the output of the AND gate 97 a control signal Sm is produced during the time interval which includes at least the scanning of the control marks 74 at the symbol positions 16 and which at most include the scanning of the symbol positions p13 to p18. The control signal Sm on the output of the detector circuit 81 is applied to a control input of an electronic switch 83, which is responsive to the control signal to apply the detection signal Vd to a pulse shaper 84, for example a level-sensitive monostable multivibrator.

In this way a pulse is generated on the output of the pulse shaper 84 in response to the scanning of the control mark 74. This pulse is applied to a phase detector 85 of a phase-locked loop circuit, which further comprises a loop filter 86, a voltage-controlled oscillator 87 and a frequency scaler divider in the form of a cyclic counter 43a, which every counting cycle supplies one pulse to the phase detector 85. The counter range of the counter 43a corresponds to the number of symbol positions within the track segments 71, so that the count of the counter 43a always indicates the instantaneously scanned symbol position within the track segment 71. The output signals of the counter 43a are applied to a gate circuit 45a via a bus 44a, which gate circuit derives five signals S1', S2', S3' and S4' from the count in the customary manner, in such a way that the signal S1' is "1" for the count which indicates that the symbol position p23 is scanned, the signal S2' is "1" for those counts which indicate that the symbol positions p25 to p264 are scanned, the signal S3 is "1" for the count which indicates that the symbol position p21 is scanned, and S5 is "1" for the count which indicates that the symbol position p14 is scanned.

In the same way as the write circuit is controlled by the signals S1, S2 and c1 in the embodiment described with reference to FIG. 4, the write circuit 48 in the embodiment shown in FIG. 7 is controlled by the signals S1', S2', c1, the signal c1 being the output signal of the oscillator 87.

Control of the read circuit 55 by the signals c1, S1' and S2' is also similar to control of the write circuit 55 by the signals c11, S1 and S2 in the embodiment shown in FIG. 4.

The signals S3, S4 and S5 are used for determining the sampling instants for the sampled servo controls for the purpose of tracking and focussing.

The sampled servo control for tracking comprises a first (88) and a second (89) sample-and-hold circuit to which the detection signal Vd is applied. The outputs of the circuits 88 and 89 are respectively applied to the inverting input and the non-inverting input of a differential amplifier 90.

The circuit 88 is controlled by the signal S3, which indicates the scanning instant of the control mark 75 at symbol position p19.

The circuit 89 is controlled by the signal S4, which indicates the scanning instant of the control mark 76 at symbol position p21.

The control mark 75 is offset from the center 91 of the track 4. The control mark 76 is offset from the center 91 in the opposite direction.

The output signal on the output of the differential amplifier 90, which signal indicates the difference in the detection signal Vd at the scanning instants of the control marks 75 and 76, is consequently a measure of the tracking error.

The output signal is applied to a control circuit 92, which in a customary manner derives a control signal from the tracking error, which control signal is applied to the write/read head 47 to keep the beam 46 centered on the track 4 to be scanned.

The sampled servo control for keeping the radiation beam 46 in a focus on the layer 6 comprises a focus-error detection system of a customary type, for example an astigmatic focus-error detection system accommodated in the write head 47, to generate the focus-error signal. The focus-error signal is applied to a sample-and-hold circuit 93, which is controlled by the signal S5, which indicates the instant at which a flat portion of the layer 6 at the location of the symbol position p14 is scanned. The output signal of the sample-and-hold circuit 93 is applied to a control circuit 94, which derives a control signal from the sampled focus-error signal to keep the beam 46 focussed on the layer 6.

The embodiment of the write and read device shown in FIG. 7, which combines the use of reference marks for determining the decision level with the use of sampled servo systems and the use of circuits for deriving the clock signal from the control symbols 72, has the advantage that the pattern of recording marks 8 used for recording the information has no influence whatsoever on the generation of the clock signal, the tracking control, the focus control, and the derivation of the decision level. Thus, the number of requirements to be imposed on the code is minimal, which means that code classes may be used which enable a very high information density to be achieved on the record carrier.

The invention has been described for a record carrier which is read in reflection, but it will be obvious that the invention may also be applied to record carriers read in transmission.

What is claimed is:

1. A method of recording information in a track on a record carrier of an inscribable type by forming a pattern of optically detectable recording marks, characterized in that optically detectable reference marks independent of the recording marks used for recording the information signal are provided at positions outside the track portions used for information recording.

2. A method as claimed in claim 1, characterized in that the track is provided with preformed optically detectable control symbols which can be distinguished from the pattern of recording marks to be formed for providing control information, the reference marks being provided at predetermined positions relative to the control symbols.

3. A method as claimed in claim 2, characterized in that the spacings between successive control symbols are substantially constant, the control symbols being servo-control symbols provided for the purpose of tracking, focussing and clock regeneration.

4. A device for recording information in a track on an inscribable record carrier by forming a pattern of optically detectable recording marks, which device comprises drive means for moving the record carrier past a write head and a control circuit for controlling the write head in response to a code signal which is related to the information, in order to form said pattern of recording marks, characterized in that the control circuit comprises means for temporarily interrupting the formation of said recording mark pattern and means for generating during said interruption a control signal for the write head, to form reference marks on the record carrier.

5. A device as claimed in claim 4, the record carrier being of a type in which the track is provided with preformed optically detectable control symbols which can be distinguished from the pattern of recording marks to be formed for the purpose of recording the information, characterized in that the device comprises means for detecting the passage of the control patterns relative to the write head, and in that the control circuit comprises means responsive to the detection of the passage of control patterns to temporarily interrupt the generation of code signals and to generate the control signal for the formation of at least one of the reference marks.

6. A device for reading a record carrier on which information is recorded in a track by means of a pattern of optically detectable recording marks, which device comprises a scanning device for scanning the track by means of a radiation beam, the radiation beam reflected or transmitted by the record carrier being modulated in conformity with the pattern of recording marks, an optical detector for detecting the modulated radiation beam and for generating a detection signal of a signal strength corresponding to the modulation of the radiation beam, and means for converting the detection signal into a binary code signal by comparison of the signal strength with a decision level, characterized in that the device comprises means for detecting portions of the detection signal which represent reference marks which are situated outside the track portion used for recording the information and means for deriving the decision level from the signal strength of the detected portions.

7. A device as claimed in claim 6, characterized in that the device comprises means for detecting portions of the detection signal which are representative of the control symbols in the information track, which symbols can be distinguished from the patterns of recording marks used for recording information, and means for deriving the instants at which the reference marks situated at predetermined positions relative to the control symbols are scanned from the detection instants of the portions of the detection signal which correspond to the control symbols.

8. A device as claimed in claim 6 or 7, characterized in that the device comprises clock-generation means for generating a first clock signal which is indicative of the instants at which the detection signal is to be compared with the decision level, which clock-generation means are adapted to generate a second clock signal which is in synchronism with the scanning instants of the reference marks, and which is phase-shifted relative to said scanning instants by a value corresponding to half the period of the first clock signal, and in that the decision-level-deriving means comprise a sample-and-hold circuit for sampling the detection signal in response to the second clock signal in order to derive the decision level.

9. A device as claimed in claim 6 or 7, characterized in that the decision-level-deriving means comprise a detection circuit for determining the height of the detection-signal peaks during derivation of the reference marks relative to the detection-signal value immediately before or after scanning of the reference mark, and means which adjust the decision level to a value corresponding to a specific fraction of the detected peak height.

10. A device as claimed in claim 8 or 9, for reading disc shaped record carriers, characterized in that means for adjusting the decision level include means for adapting the decision level depending on the radial position of the track portion being scanned.

11. A device as claimed in claim 6, characterized in that the device comprises sampled servo-controls for controlling the tracking and focussing depending on measurement signals derived from the radiation beam which is modulated by substantially equidistant control symbols when said symbols are scanned, and a clock-generation circuit for generating a clock signal which is in synchronism with said detection instants of the control symbols.

12. A device as claimed in claim 6, characterized in that the reference-level-deriving means include means for determining a weighted mean of the signal strength of the detection-signal portions which correspond to the reference marks being scanned and means which derive the decision level from the weighted mean thus determined.

* * * * *